June 7, 1932.　　　　　H. GODOY　　　　　1,862,013
VEHICLE
Filed Feb. 26, 1931　　　3 Sheets-Sheet 1
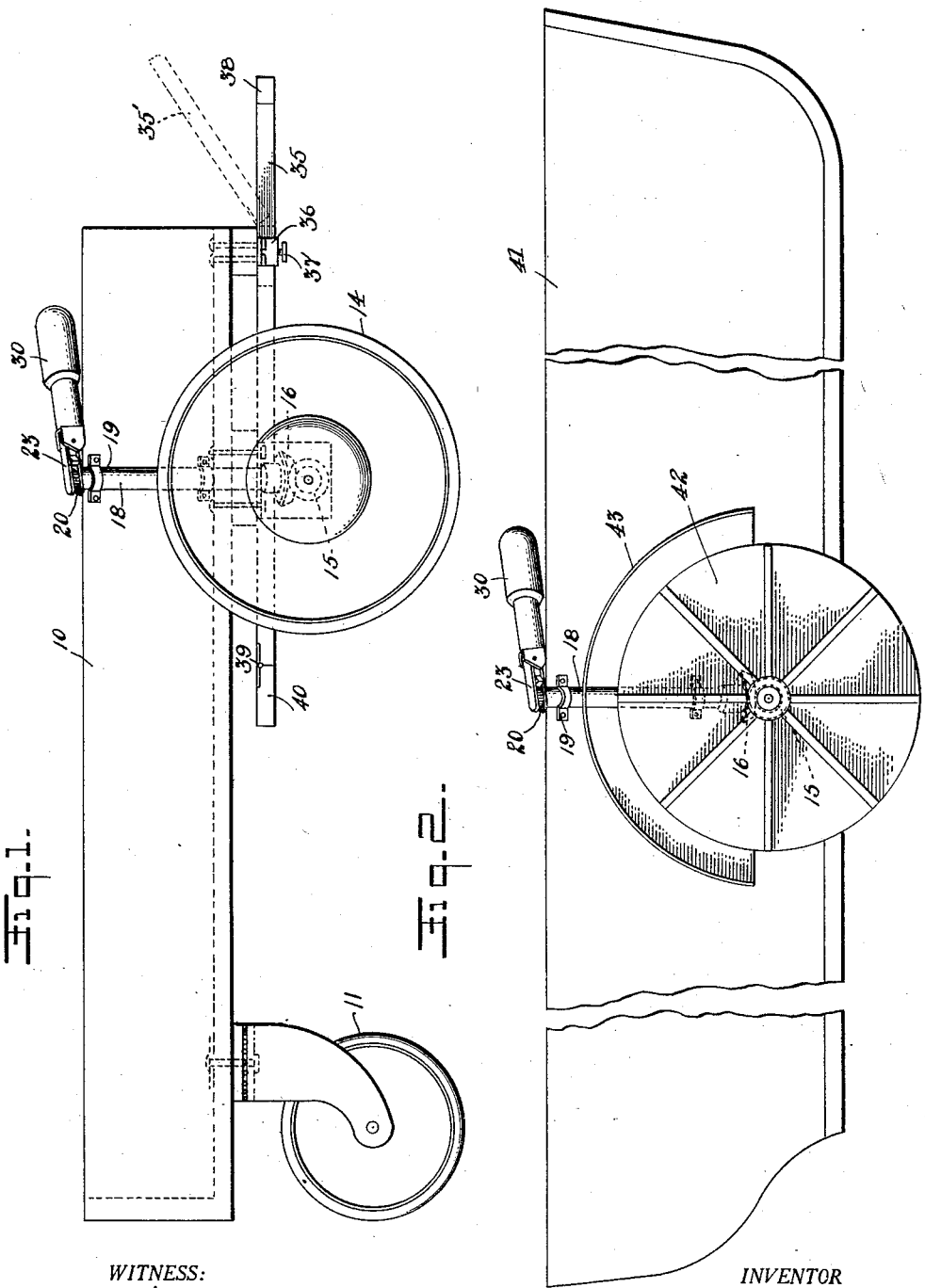
WITNESS:
INVENTOR
Humbert Godoy.
BY
Joshua R H Potts
HIS ATTORNEY

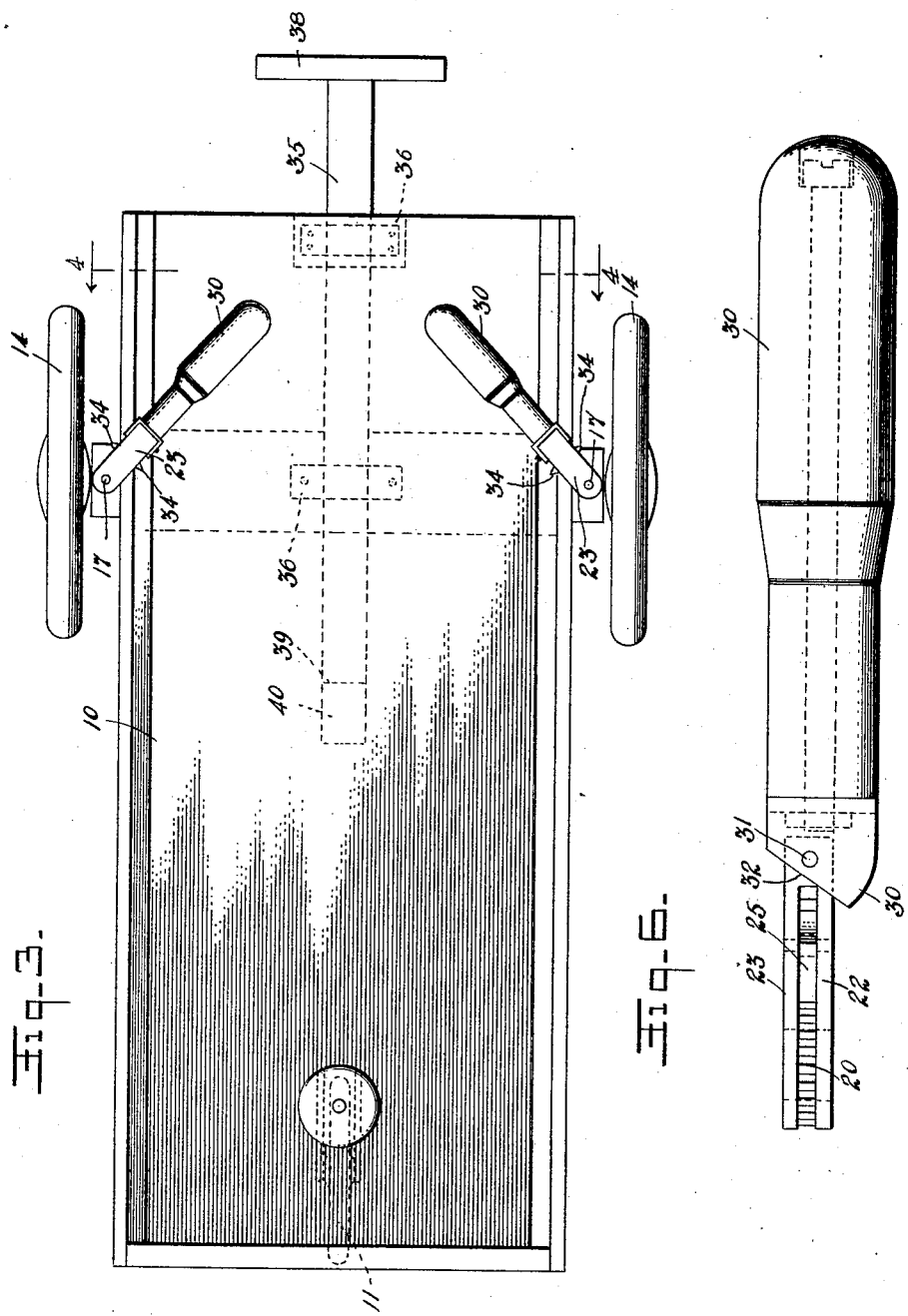

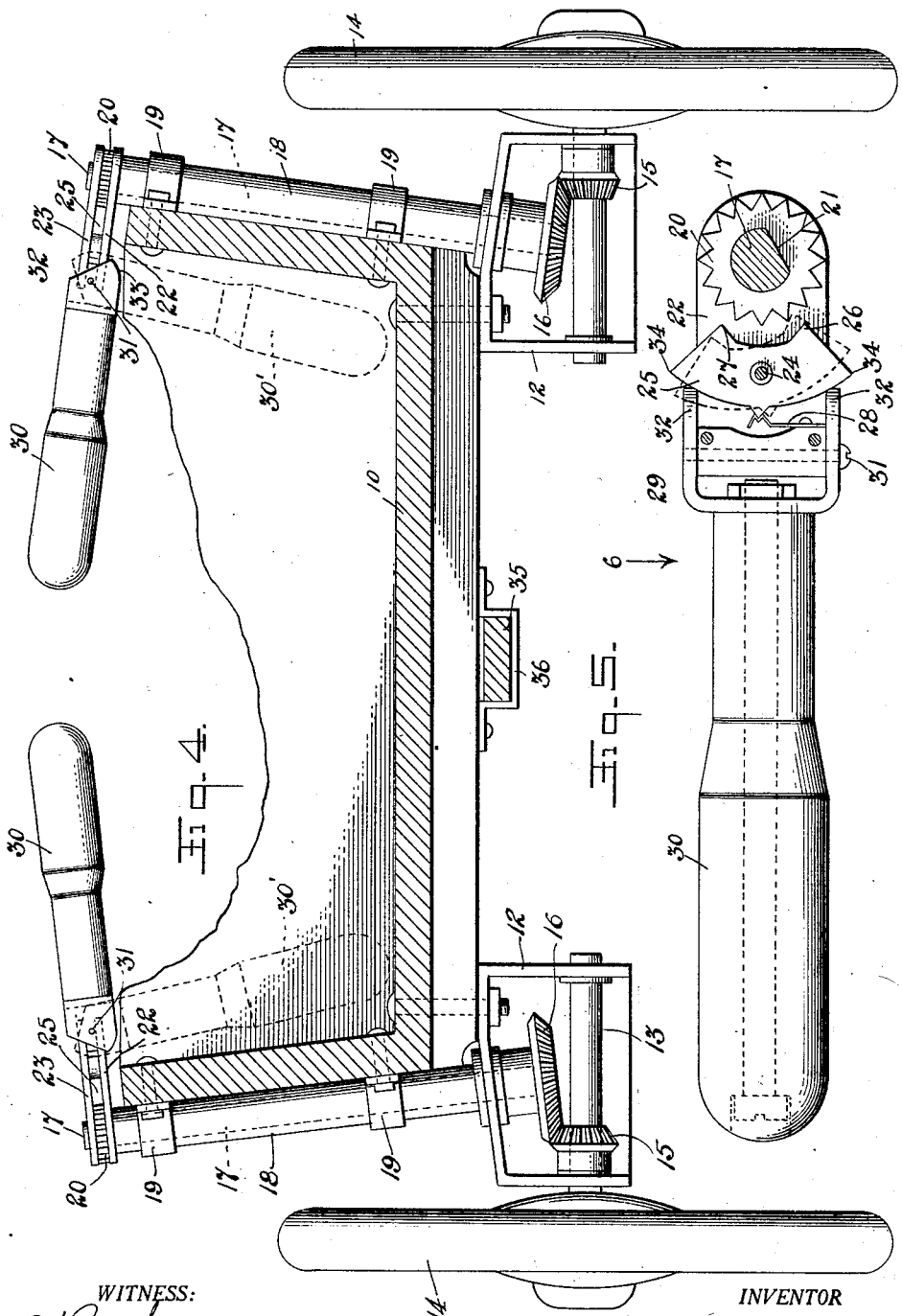

Patented June 7, 1932

1,862,013

UNITED STATES PATENT OFFICE

HUMBERT GODOY, OF PHILADELPHIA, PENNSYLVANIA

VEHICLE

Application filed February 26, 1931. Serial No. 518,336.

This invention relates to vehicles for both land and water, and as a land vehicle, has especial reference to vehicles intended for use of children or the like.

A further object of the invention is to provide a vehicle either for land or water, in which the motive power is manually applied, and the user employs an action similar to that of rowing a boat, but faces forwardly.

A further object of the invention is to provide a vehicle wherein the steering or guiding of the vehicle is accomplished by the manipulation of the levers employed in the rowing action.

A further object of the invention is to provide a land vehicle having an adjustable foot rest for the use of the occupant, which said foot rest is convertible into a handle for employing the vehicle as a hand-drawn wagon.

A further object of the invention is to provide a vehicle having rotating side propelling wheels with a body disposed between the wheels, and levers extending from the sides of the body toward each other adapted to be oscillated in substantially a horizontal plane for the purpose of applying propulsion to the wheels.

The invention therefore comprises a body, either that of a land vehicle or a water vehicle, having propelling wheels upon the sides, either traction wheels or paddle wheels, with levers analogizing oars extending from the sides of the vehicle toward the median line, which are oscillated in conjunction with ratchet mechanism or other mechanical step-by-step devices for applying manual stress to the propelling wheels.

The invention is directed to other objects and possesses other features of novelty and advantage, some of which, together with the foregoing, will be hereinafter more fully set forth.

In the drawings:

Figure 1 is a view in side elevation of the embodiment of the present invention in a land vehicle, Figure 2 is a view in side elevation of its embodiment in a water vehicle, Figure 3 is a top plan view of the land vehicle, Figure 4 is a vertical sectional view taken substantially on line 4—4 of Figure 3, Figure 5 is an enlarged detail plan view of one of the rowing levers, and Figure 6 is a view of the lever in side elevation from the side indicated by arrow 6 at Figure 5.

Like characters of reference indicate corresponding parts throughout the several views.

The improved vehicle, which forms the subject-matter of this application, is adapted for application to either land or water vehicles of the types shown, respectively, at Figures 1 and 2.

As applied to a land vehicle, a body 10 is provided, supported at the rear by a caster wheel 11. Intermediate the ends and adjacent to the forward end, brackets 12 are secured beneath the body and therein are journaled axles 13. The axles 13 are rigidly connected with wheels 14 so that a rotation of the axles will rotate the wheels to propel the vehicle.

For applying power to the axles, the said axles are provided with bevel pinions 15 intergeared with bevel gears 16, which are carried upon the lower ends of shafts 17 extending downwardly along the sides of the body 10 through tubular sleeves 18. These tubular sleeves 18 are attached to the body in any approved mechanical manner. As shown in the drawings, clips 19 are provided, but it is to be understood that this is merely an example without limitation upon the invention.

Upon the upper ends of the shafts 17 ratchet wheels 20 are rigidly secured. This securing may be by any usual and approved mechanical means. There is shown in the drawings at 21, in Figure 5, a means of attachment, but without limitation.

Mounted to oscillate freely upon the shafts 17 is a housing composed of the sections 22 and 23. The housing thus constructed is provided with a pivot 24 fulcruming a pawl 25. This pawl 25 is provided upon opposite ends with engaging shoulders 26 and 27, and a spring 28 engages a lug 29 thereon for holding the detent either in neutral position or in operative position in either direction.

There is shown at Figure 5, in dotted lines, the suggestion of the movement of this pawl in one direction which would be the direction of engagement of the pawl with the ratchet when the lever 30 is moved in the direction indicated by the arrow at that figure. Moving in the opposite direction, the pawl will slip over the teeth of the ratchet 20.

It is obvious that this pawl may be reversed so that the engaging shoulder 27 will engage the ratchet instead of the shoulder 26.

Levers 30 are pivoted at 31 to the ratchet housing and are therefore adapted to swing upon their pivots in substantially a vertical plane.

The levers 30 are provided adjacent their pivots 31 with cams 32 which are positioned to engage the opposite ends of the pawl 25 when the levers are swung down to dotted position, as shown at 30′ in Figure 4.

An arcuate end 33 concentric with the pivot 31 provides means for holding the pawl in neutral position when the levers occupy the dotted line position.

The pawls are also provided with corners 34 extending beyond the housing by the engagement of which the position of the pawls may be manually changed from either engaging position to the other, or to neutral.

Beneath the body 10 a bar 35 is carried mounted to slide in keepers 36, one of which is provided with clamping means illustrated by the screw 37.

This bar 35 is provided at its forward end with a cross-head 38 which may be adjusted to occupy the proper position as a foot rest for the occupant of the body 10. Adjacent its rearward end the bar 35 is provided with a hinge 39 so that when the bar 35 is drawn forwardly to its limit, the section 40, defined by said hinge, will be engaged by the clamping member, permitting the bar 35 to be raised, as indicated in dotted lines in Figure 1, and thereby becomes a handle for drawing the vehicle as a wagon.

When applied to a water vehicle, the boat-like body 41 will be of any type, and instead of the traction wheels 14, a paddle wheel 42 will be substituted, preferably covered by a fender 43. In all other respects the structure is identical with that shown for a land vehicle.

In operation, if the levers 30 occupy the dotted line position as shown at Figure 4, the pawl 25 is held in neutral position by the arcuate parts 33, and the wheels 14 are therefore free to rotate without hindrance from the levers 30.

It thus becomes a wagon of the type ordinarily referred to as "express" wagon and it may be employed for transportation purposes in that condition. When, however, it is to be employed as propelled by the levers, the levers are raised to the full line position shown at Figure 4, whereupon the pawls 25 are released. The pawls are now manually moved to the position shown in dotted lines at Figure 5, if it is the intent of the occupant to propel a vehicle on a forwardly direct course.

The oscillation of the levers 30 about the shafts 17 in the manner of rowing a boat will therefore alternately engage the shoulder 26 of the pawl with the teeth of the ratchet, and intermediate such engagements with the return oscillation of the levers 30, the pawls will slip over the teeth and be in position for further engagement when the idle stroke of the ratchets has been completed.

The vehicle is therefore propelled wholly by drawing the levers 30 toward the occupant. When it is desired to reverse the motion of the vehicle, that is, to "back up", the pawls 25 are reversed so that the corners 27 engage the ratchet. In this relation the stroke of the levers being "pushed" is the working stroke.

The vehicle is guided in the manner of guiding a row boat, that is to say, one of the levers may be drawn while the other remains inactive, or one may be drawn more actively than the other as the requirements of steering may dictate.

In the matter of the water vehicle, the action is exactly the same. The rowing motion will actuate the paddle wheels and either paddle wheel may be actuated more actively than the other for the purpose of steering the boat.

The disclosure of the present invention has been directed only to the propelling means and it is to be understood that this is no limitation upon applying any type of braking or retarding means as may be found necessary or desirable.

While the ratchet mechanism, consisting of the ratchet wheel 20 and pawl 25, is an efficient and desirable type of mechanical movement for the purpose, it is to be understood that it is no limitation and that any other type of step-by-step engaging structure may be substituted therefor.

Of course the vehicle herein disclosed may modified and changed in various ways without departing from the invention herein set forth and hereinafter described.

The invention is hereby claimed as follows:

1. A vehicle comprising a body, propelling and supporting wheels, levers fulcrumed above the body to oscillate independently about fixed axes substantially in a horizontal plane, and transmitting means from said levers to said propelling wheels.

2. A vehicle comprising a body, propelling and supporting wheels, levers fulcrumed to oscillate independently about fixed axes above the body and extending toward each other, transmitting mechanism from said levers to said propelling wheels, step-by-step engaging mechanism forming a part of said transmission mechanism, and means to employ the independent oscillation to steer the vehicle.

3. A vehicle comprising a body, propelling and supporting wheels journaled adjacent to the remote sides of and extending below the body, levers fulcrumed adjacent the sides of and extending transversely of the body normally toward each other and adapted to swing toward the body to inoperative positions, and transmission mechanism from said levers to said wheels.

4. A vehicle comprising a body having opposed walls, propelling wheels journaled beyond the remote sides of said walls and extending below the body, levers fulcrumed adjacent the tops of the walls to swing substantially in horizontal planes and to drop to inactive positions approaching the vertical, and transmission mechanism from said propelling wheels actuated by the levers in their normal horizontal positions.

5. A vehicle comprising a body having opposed walls, propelling wheels journaled beyond the remote sides of said walls, shafts extending upwardly along said walls, means connecting said shafts with the propelling wheels to actuate the wheels, levers fulcrumed adjacent the upper ends of the shafts to oscillate thereon normally in substantially horizontal planes, and means for connecting said levers with said shaft with a step-by-step connection.

6. A vehicle comprising a body having opposed walls, propelling wheels journaled beyond the remote sides of said walls, shafts extending upwardly along the walls, means interconnecting the shafts and propelling wheels, ratchets carried adjacent the upper ends of the shafts, levers fulcrumed adjacent the upper ends of the shafts to oscillate in substantially horizontal planes, and pawls carried by said levers adapted to engage the ratchets.

7. A vehicle comprising a body having opposed sidewalls, propelling wheels journaled beyond the remote sides of said walls, shafts extending upwardly upon the sides of said walls, means intergearing the shafts with the propelling wheels, ratchets carried adjacent the upper ends of the shafts, levers fulcrumed to oscillate upon the shafts in substantially horizontal planes, pawls carried by said levers adapted to engage the ratchets, and means to manually adjust said pawls for step-by-step engagement in either direction.

8. A vehicle comprising a body having opposed sidewalls, propelling wheels journaled beyond the remote sides of said walls, shafts extending upwardly along the sides of the walls, means intergearing the shafts and propelling wheels, ratchets carried adjacent the upper ends of the shafts, levers fulcrumed upon the shafts adapted to oscillate in substantially horizontal planes, a pawl positioned to make engagement with the ratchet, and means carried by the levers for throwing said pawl out of engagement with the ratchet when said levers are released.

9. A vehicle comprising a body having opposed walls, propelling wheels journaled beyond the remote sides of the walls, shafts extending upwardly along the sides of the walls, means intergearing the shafts and propelling wheels, ratchet wheels carried by the shafts adjacent their upper ends and above the limits of the sidewalls, a housing fulcrumed upon the shaft and embracing the ratchet, a pawl pivoted within the housing and having means for engagement with the ratchet when manually adjusted for movement in either direction, levers pivoted to the housing to swing in vertical planes, means carried by said levers for engaging the pawls for moving said pawls to neutral position when approaching their vertical limit, said means releasing the pawls for manual adjustment when the levers are in normal horizontal positions.

10. A vehicle comprising a body having propelling wheels, levers fulcrumed adjacent the upper limits of the body to oscillate in substantially horizontal planes and to swing to substantially vertical positions, and means interconnecting the levers with the propelling wheels to advance the propelling wheels with a step-by-step action when the levers are in horizontal positions, interconnection being interrupted when the levers assume such vertical positions.

In testimony whereof I have signed my name to this specification.

HUMBERT GODOY.